July 21, 1942.  W. C. WICKER  2,290,307
CAMERA CASE
Filed May 28, 1938  3 Sheets-Sheet 1
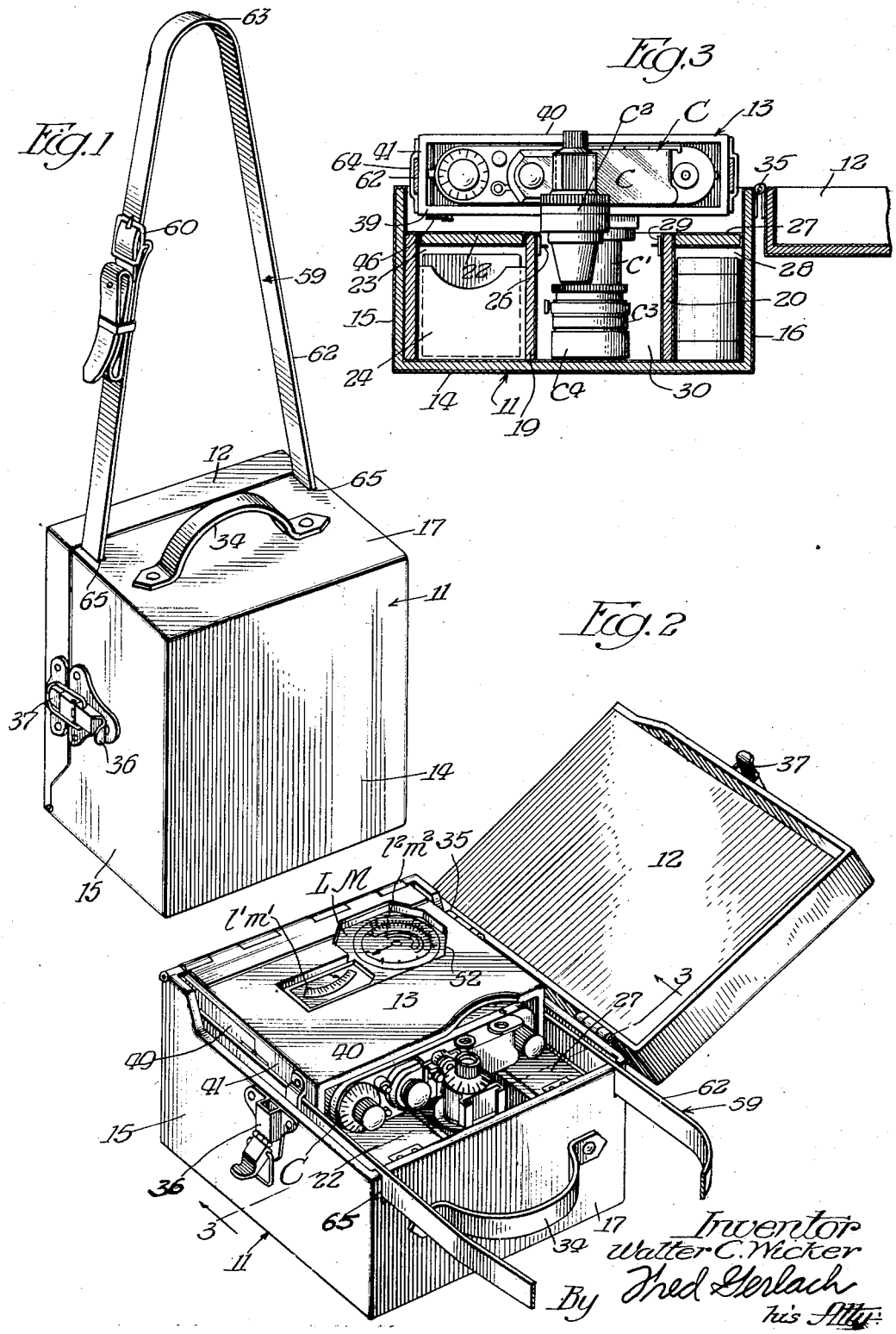

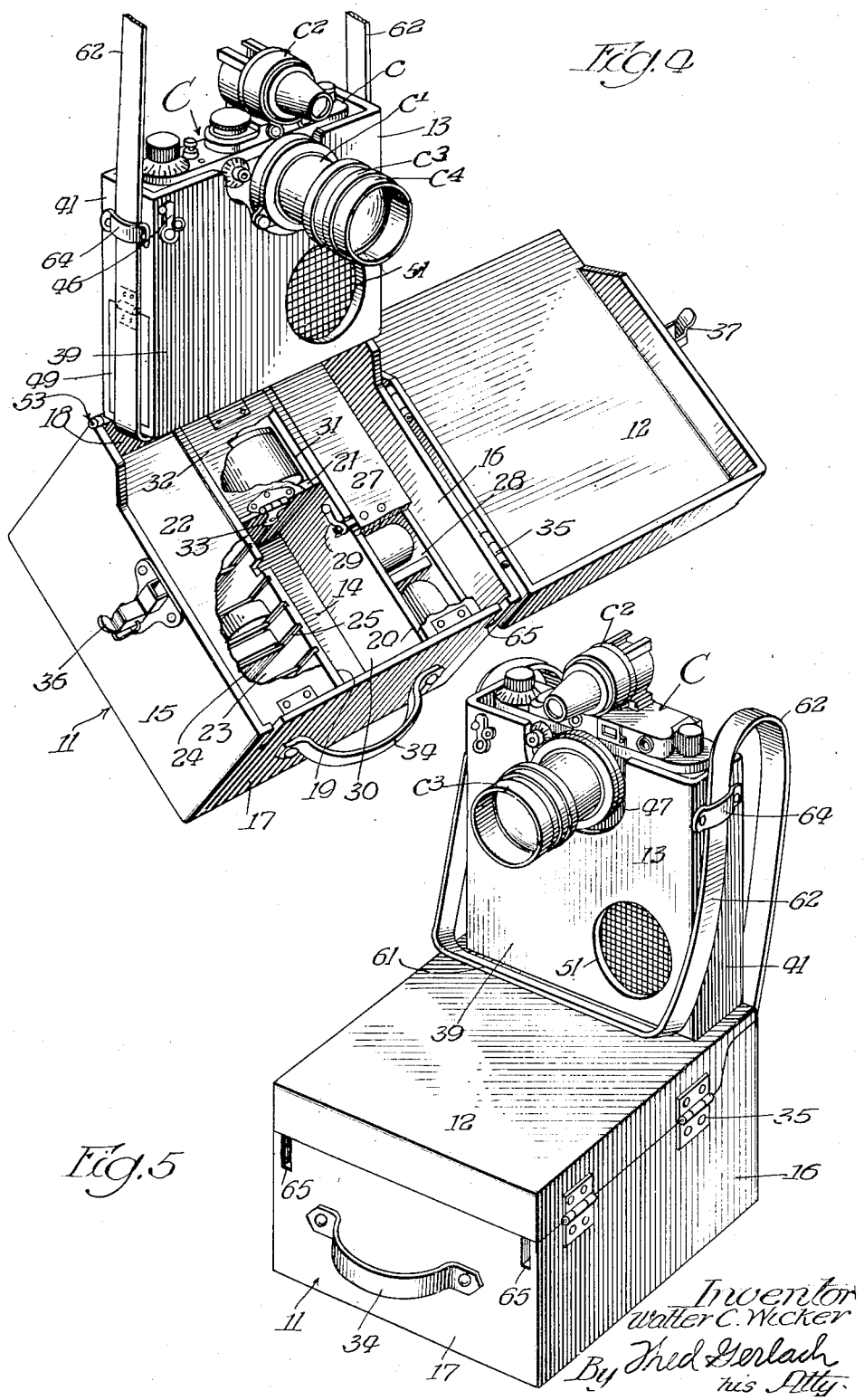

July 21, 1942.  W. C. WICKER  2,290,307
CAMERA CASE
Filed May 28, 1938   3 Sheets-Sheet 3
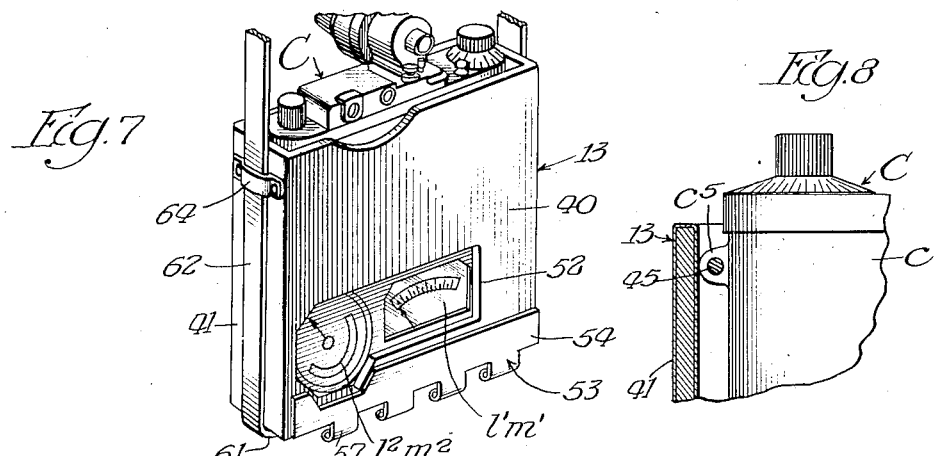
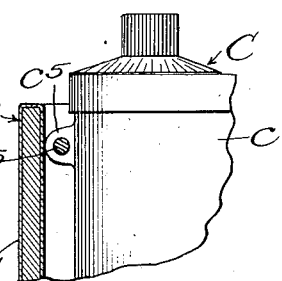
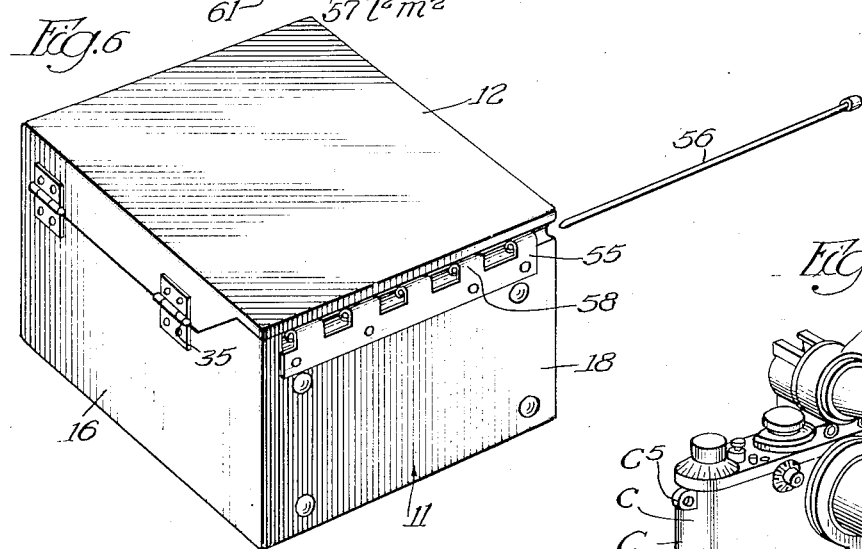
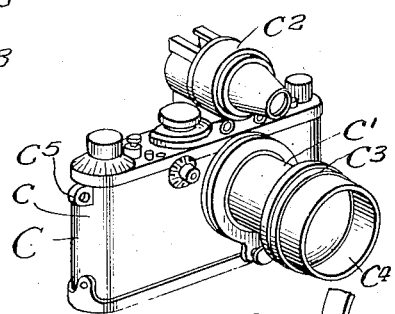
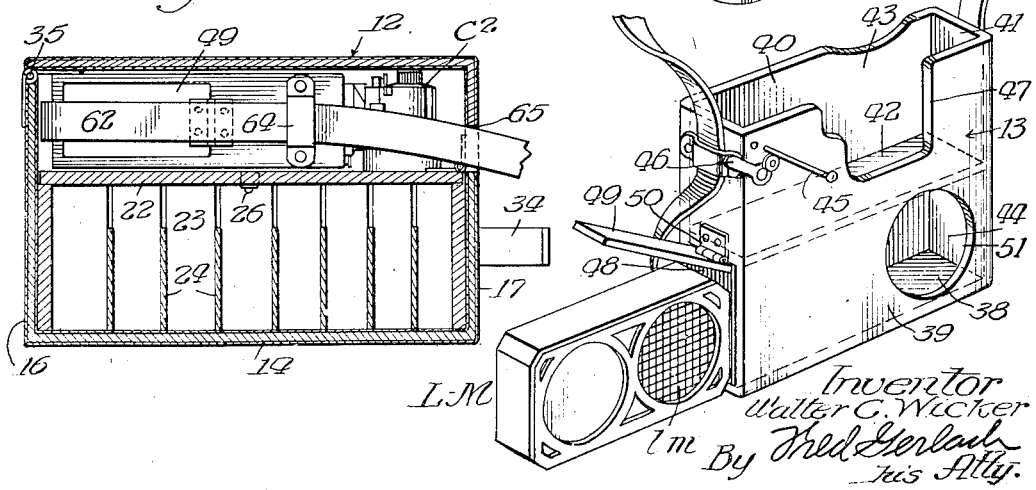
Inventor
Walter C. Wicker
By Fred Gerlach
his Atty.

Patented July 21, 1942

2,290,307

UNITED STATES PATENT OFFICE 2,290,307

CAMERA CASE

Walter C. Wicker, Chicago, Ill.

Application May 28, 1938, Serial No. 210,546

15 Claims. (Cl. 95—86)

The present invention relates generally to cases for cameras. More particularly the invention relates to that type of case which comprises a boxlike body and a cover for closing the top of the body and is especially designed for use in connection with a small sized extensible lens camera having an auxiliary equipment therefor a view-finder, a sun-shade, and a color filter.

One object of the invention is to provide a case of this type which is of such design and construction that the camera may be carried in the body thereof with its lens extended and its auxiliary or accessory equipment in place thereon and hence upon opening of the cover of the case is in readiness for immediate use.

Another object of the invention is to provide a camera case of the type and character under consideration which in addition to the body and cover comprises a section having a compartment therein for the camera and an adjoining compartment for a light meter.

Another object of the invention is to provide a camera case of the last mentioned character in which the section is pivotally connected to the upper portion of the body so that it is adapted when the cover is swung into its open position to be swung from a normal position within the upper portion of the body into an operating position wherein it is exteriorly disposed with respect to the case body, and is of such design and construction that the operating parts of the camera and light meter are exposed and the latter may be hence used in connection with photographic work while in their respective compartments in the section and the latter is positioned exteriorly of the body.

Another object of the invention is to provide a camera case of the aforementioned type and character in which the hinged connection for the section with the compartments therein for the camera and light meter is of the detachable variety so as to permit the section with the camera and light meter therein to be detached from the body when the owner or user of the case desires only to carry the section in connection with a short photographic trip, and furthermore is so arranged that when the section is exteriorly disposed with respect to the body and the cover for the body is closed, the section may be supported on the cover in connection with time exposures.

Another object of the invention is to provide a camera case of the type hereinbefore referred to in which the body has door closed compartments in the bottom portion thereof for supplies of film and additional camera accessories such as other filters, delayed timers, and color film and filters, and the camera-light meter section is designed when in its closed position within the body to overlie the compartments and hold the doors therefor in their closed position.

A further object of the invention is to provide a camera case of the last mentioned character in which the hinged section for the camera and light meter serves effectively to protect the latter against breakage while they are in their respective compartments and has means associated with it whereby the camera and light-meter may be readily removed from their compartments and in addition has a neck strap which serves as a medium for carrying the camera-light meter section when the latter is disconnected from the body of the case and also as a medium for carrying the case and section when the section is connected to the case and is disposed in its closed position, that is, within the body of the case.

A still further object of the invention is to provide a camera case which is generally of new and improved construction and not only occupies but a small amount of room and contemplates a compact arrangement of the camera and its associated parts but also may be manufactured at a low and reasonable cost and fulfills its intended purpose in an efficient and effective manner.

Other objects of the invention and the various advantages and characteristics of the present camera case will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals and letters of reference denote corresponding parts throughout the several views:

Figure 1 is a perspective showing a camera case embodying the invention in its closed position, that is, with the hinged section thereof within the body of the case and the cover for the body in its operative position;

Figure 2 is a perspective showing the cover in its open position and the camera-light meter section in its closed position wherein it is disposed over the door closed storage compartments in the bottom portion of the body;

Figure 3 is a section taken on the line 3—3 of Figure 2 and showing and illustrating in detail the manner in which the storage compartments in the bottom of the body of the case are arranged to form a space for housing the lens and view-finder of the camera when the camera-light meter section is in its closed position;

Figure 4 is a perspective showing the cover of the case in its open position and the camera-light meter section in its operative position wherein the camera and meter are disposed exteriorly of the body and are in readiness for use;

Figure 5 is a perspective showing the cover of the case in ts closed position and the hinged section mounted on top of the cover in a position wherein the camera is supported in readiness to take time exposures;

Figure 6 is a perspective of the case showing the cover in its closed position and the pin of the hinge connection for the camera-light meter section removed so as to free the section from the body of the case;

Figure 7 is a perspective of the camera-light meter section showing the same after disconnection or removal from the case body;

Figure 8 is an enlarged fragmentary sectional view illustrating in detail the construction and arrangement of the means for releasably securing the camera in its compartment in the hinged section of the case;

Figure 9 is a section showing the camera and light-meter hinged section and the cover of the case in their closed positions and illustrating the manner in which the neck strap of the section is permitted to extend to the outside of the case; and Figure 10 is a perspective of the camera light-meter section of the case illustrating the manner in which the camera and light-meter are removable from their respective compartments.

The case which is shown in the drawings constitutes the preferred embodiment of the invention. It is adapted for use in connection with a camera C and comprises as the main parts thereof a body 11, a cover 12, and a section 13. The camera C is of small size and conventional or standard design. It embodies a housing $c$, a lens $c^1$, a view-finder $c^2$, a color-filter $c^3$, and a sun-shade $c^4$. The lens $c^1$ is of the extensible variety and is adapted by turning thereof to move in and out in connection with focusing of the camera. The view-finder $c^2$ is removably mounted on the top of the body of the camera and overlies the lens, as shown in Figure 4. The color-filter $c^3$ and the sun-shade $c^4$ are in the nature of auxiliary equipment and are adapted for use in certain kinds or types of photographic work. The color filter is adapted to be applied to the outer end of the lens mounting and consists of a ring with a colored lens therein. The sun-shade $c^4$ also consists of a ring and is adapted to be slid around the outer end of the ring of the color filter.

The body 11 of the case is of box-like design and consists of a bottom 14, a pair of side walls 15 and 16, and a pair of end walls 17 and 18. The side walls 15 and 16 are positioned in parallel relation and are suitably secured at their bottom margins to the side margins of the bottom 14. The end walls 17 and 18 extend between and are suitably secured to the end margins of the side walls and like said side walls are positioned in parallel relation. The top portion of the body is open in order to provide access to the interior of the body. In the bottom portion of the body are three strips 19, 20 and 21. The strips 19 and 20 are positioned in laterally spaced and parallel relation and extend between, and have their ends suitably connected to, the central portions of the inner faces of the end walls 17 and 18. The strip 19 is spaced inwardly from the side wall 15 and together with a hinged door 22 and the adjacent portions of the bottom 14, the end walls 17 and 18, and said side wall 15, forms a storage compartment 23 for additional lenses, light filters and sun-shades, as well as other equipment. The compartment 23 is preferably sub-divided by way of partitions 24 which extend transversely across the compartment and fit within pairs of grooves 25 in the inner or opposed faces of the strip 19 and the side wall 15. The door 22 is hinged to the end wall 17 so that it is free to swing upwardly from its closed position into an open position wherein access is provided to the compartment 23. A latch 26 is applied to the door and serves to hold the latter in its closed position. The strip 20 is spaced a small distance inwards from the side wall 16 of the case body 14 and defines with a door 27 and the adjacent portions of the bottom 14, the end walls 17 and 18, and said side wall 16, a storage compartment 28. The latter is adapted to receive supplies of film and other items which may be used in connection with the camera C. The door 27 is hinged to the inner face of the end wall 17 so as to swing upwardly from a closed position across the compartment 28 into an open position wherein the compartment is exposed. Said door 27 is provided with a latch 29 for securing it in its closed position and is coplaner with the door 22 when both doors are in place over their respective compartments. The strip 21 extends transversely between the central portions of the strips 19 and 20 and defines a space 30 at one side thereof and a storage compartment 31 at its other side. The compartment 31 is closed by means of a door 32 which is hinged to the end wall 18 of the case body and embodies a latch 33 whereby it may be secured or locked in its closed position wherein it is substantially flush with the top edges of the strips 19 and 20 and closes the compartment 31. The space 30, as hereinafter described, receives and accommodates the lens $c^1$ and the view-finder $c^3$ when the camera C is housed within the case and is of such depth that the lens may be in its fully extended position and provided with the color-filter $c^3$ and the sun-shade $c^4$. A handle 34 is applied to the end wall 17. This handle permits the case together with the camera C therein to be readily transported from place to place.

The cover 12 serves as a closure for the open top of the body 11 of the case. It is connected by a pair of hinges 35 to the upper portion of the side wall 16 and is adapted to be releasably locked in its closed position by means of a bail type fastener 36. The latter is secured to the central portion of the side wall 15 and is adapted when the cover is in its closed position to extend around a bracket carried stud 37 on the central distal portion of the cover and thus secure the cover in place.

The section 13 is hollow and comprises a bottom 38, a front 39, a back 40 and a pair of laterally spaced ends 41. The front and back are spaced laterally apart and together with the bottom 38, the ends 41 and a centrally disposed partition 42 define an upper compartment 43 for the camera C and a lower compartment 44 for a light meter LM. The compartment 43 has an open top and is of proper size snugly to receive the camera housing c. The housing of the camera is adapted to be slid downwardly into the compartment in connection with mounting of the camera in the section 13 of the case and is adapted to be held in place by means of a pin 45. The latter, as shown in Figures 8 and 10, has a head at one end thereof and is adapted to extend through aligned holes in the front 39 and the back 40 of the section and also through an eye or perforated lug $c^5$ at one end of the housing of the camera. An arm 46 is pivotally connected to the front 39 and is adapted when the pin 45 is in place to be swung into a position wherein it overlies the head of the pin (see Figure 5). In such position the arm secures the pin against axial displacement and thus prevents removal or displacement of the camera with respect to the compartment 43 in the hollow section 13. When it is desired to remove the camera from the compartment it is only necessary to swing the arm 46 sidewise out of engagement with the head of the pin and then remove the pin by sliding it axially. Upon removal of the pin from the hollow section 13 the camera is free so that it may be raised or slid upwardly out of the compartment 43. The partition 42 is disposed equidistantly between the upper and lower edges of the front and back of the section and forms a fixed or rigid bottom for the compartment 43. The upper portion of the front 39 is cut away to form an irregular opening 47 for accommodating or receiving the extensible lens $c^1$ of the camera C. When the camera C is in place in the compartment 43 the various operating parts thereof are disposed exteriorly of the section and the camera can hence be operated in connection with photographic work. The light meter LM is of conventional or standard design and has a light receiving opening $lm$ in the front thereof and a gauge $l^1m^1$ and a dial $l^2m^2$ at its back portion. By proper use of the gauge and manipulation of the dial the intensity of the light entering the opening $lm$ may be ascertained as well understood in the art. The compartment 44 is of the proper size snugly to receive the light meter LM and is accessible for disposition of the light meter therein and removal of the light meter therefrom by way of a doorway 48 in the lower portion of one of the ends 41 of the section 13. This doorway is normally closed by means of a door 49 which is connected by a hinge 50 to the central portion of the end having the doorway 48 therein. The front 39 of the section embodies a circular opening 51 and is disposed beneath the opening 47 for the lens of the camera and is so positioned that it registers with and permits the passage of light to the light receiving opening $lm$ of the light meter LM when the latter is in place in the compartment 44. The back 40 of the section 13 is provided in the lower portion thereof with an elongated irregular opening 52. This opening serves to expose the gauge $l^1m^1$ and the dial $l^2m^2$ when the light meter is in place in its compartment 44. When the camera and light meter are in their respective compartments the camera is disposed over the light meter and both are accessible for operation. By having the light meter disposed beneath the camera the gauge $l^1m^1$ is continuously in view during the taking of a picture with the camera C and any variation in the intensity of the light may be readily ascertained. In the event that it is necessary to remove the light meter LM from the compartment 44 it is only necessary to swing outwardly and upwardly the door 49 and then slide the light meter longitudinally through the doorway 48 at one end of the compartment. The compartment 44 is preferably of such length that a container for an extra film may be interposed between the door 49 and the contiguous end of the light meter and thus retained in the compartment 44 for emergency use. The section 13 is connected by way of a hinge connection 53 to the upper margin of the end wall 18 so that it is free to rotate from a closed or normal position within the upper portion of the body into a position wherein it is disposed exteriorly with respect to the case body and the camera and light meter are adapted for use. The connection 53 comprises an ear equipped hinge plate 54 on the bottom portion of the back 40 of the case 13, an ear equipped hinge plate 55 on the upper margin of the end wall 18 of the case body 11, and a pivot pin 56. The ears of the hinge plate 54 are spaced from one another and project beyond the bottom portion of the back 40 of the section 13. They are bent or shaped to form longitudinally aligned cylindrical bearings 57 and fit between the ears of the hinge plate 55 when the hinge is in its assembled position. The ears of said hinge plate 55 project slightly above the upper portion of the end wall 18 of the body of the case and are bent inwardly to form longitudinally aligned cylindrical bearings 58. When the hinge is in its aforesaid assembled position the bearings 58 are axially or longitudinally aligned with the bearings 57 and both sets of bearings carry the pin 56. The latter is adapted to be slid longitudinally out of engagement with the bearings, as shown in Figure 6, so as to release the two hinged plates 54 and 55 in connection with disconnection of the camera-light meter section 13 from the body of the case. When the section is swung into its normal or closed position in the upper portion of the body (see Figure 9) the front 39 rests on and serves to maintain closed the doors for the storage compartments 23, 28 and 31. In such position of the section the extensible lens $c^1$ and the viewfinder of the camera are disposed in the space 30 in the bottom portion of the case body 11. When the cover 12 of the case is in its closed position and the section 13 is in place in the body the back 13 of the section is engaged by the cover and the latter serves to prevent swinging of the section as well as any injury to the view-finder $c^2$ or any of the other operating parts of the camera. When it is desired to use the camera in connection with photographic work the fastener 36 is released and the cover is then swung into its open position. Thereafter the hollow camera-light meter section 13 is swung out of the upper portion of the case body 11, as shown in Figure 4. If the user of the camera desires to make a short photographic trip and does not choose to be encumbered in any way by the weight of the body and cover of the case, it is only necessary to remove the pin 56 of the hinge connection 53 and thus release the section 13 from the case body. The hinge connection 53 is so designed or constructed that when the section 13 is exteriorly disposed with respect to the body 11 the cover may be swung into and secured in its closed position. In such position the section 13, as shown in Figure 5, may be swung inwardly in order to bring the bottom 38 into engagement or overlapped relation with the outer face of the cover 12. In such position the section 13 is supported by the cover and body of the case and the latter may be used as a tripod or camera support or base in connection with time exposures.

In addition to the body 11, the hinged cover 12, and the camera-light meter section 13, the case comprises a neck strap 59. This strap embodies a buckle 60 for releasably securing the ends thereof together and comprises a bottom part 61, a pair of side parts 62 and a top neck encircling part 63. The bottom part 61 of the strap fits under the bottom 38 of the section 13 and the side parts 62 fit against and project upwardly from the ends 41 of the section and are connected to the latter by means of a pair of strap formed cross loops 64 on the upper portions of the section ends 41. The upper corners of the end wall 17 of the case body are provided with slots 65 for receiving the side portions 62 of the neck strap. These slots permit the upper portions of the side parts 62 and the neck part 63 to be disposed outside of the body 11 of the case when the case is in its closed position in order that they are available for case and camera carrying purposes. When the case is opened the side portions of the neck strap may be slid out of the slots 65 and the strap thus adapted for use in carrying the camera-light meter section 13. When said section 13 is swung over and supported on the cover 12, as shown in Figure 5, in connection with time exposure work, the bottom part 61 of the strap is shifted forwardly out of engagement with the bottom 38 of the strap in order to permit the bottom to rest directly on the adjacent portion of the cover 12.

When it is desired to carry the case while the latter is in its closed position the neck strap 59 is placed around the neck of the user or over the latter's shoulder. In carrying the case the cover 12 is preferably positioned next to the user's body so that the camera and light meter face forwardly. When it is desired to use the camera while the case is being carried by means of the neck strap 59 the fastener 36 is released and the cover 12 is swung backwardly and sidewise into its open position. Thereafter the body 11 of the case is swung downwards, as shown in Figure 4. In this position of the case the section 13 is fully exposed and may be grasped by the hands and raised to an eye level. In such a position the operator may take pictures with the camera and make light intensity calculations with the light meter LM. By reason of the fact that the case embodies the space 30 the camera may be carried in condition for immediate use, that is, with its various attachments in place thereon. Because of this, when the case is open the camera is adapted for immediate use. When the section 13 is disposed exteriorly of the body 11 access may be had to the storage compartments 23, 27 and 31 by raising or opening the doors therefor. When it is desired to close the case after photographic work with the camera, the section 13 is swung inwards into the upper portion of the body 11 and the cover 12 is then closed and secured in place by way of the fastener 36. In connection with closing of the case the side parts 62 of the neck strap 59 are slid into the slots 65 in the end wall 17 of the case body directly after swinging of the section 13 into place in the upper portion of the body. If it is desired to use the section 13 independently of the case body and cover in connection with a short photographic trip the cover is first opened and then the section 13 is released from the case body by removing the pin 56 of the hinge connection 53. After the case is disconnected from the body it may be carried by way of the neck strap 59. The portion of the side part of the neck strap that fits against the end 41 with the doorway 48 therein extends across the door 49, as shown in Figure 4, and serves to hold the door closed. When the camera-light meter section is connected to the body 11 and it is desired make time exposures using the body and cover as a tripod or base for the camera the section 13 is first swung out of its normal position with in the upper part of the body 11 and then the cover 12 is closed. Thereafter the bottom part 61 of the strap is shifted away from the bottom of the section 13 and the section is swung over the top in order to bring it into an upright position wherein said bottom 38 rests on the cover. If for any reason the camera user desires use the camera C independently of the section 13 the arm 46 is first manipulated so as to release the pin 45. Thereafter the pin is removed and the camera slid upwardly out of its compartment 43, as hereinbefore pointed out. In order to remove the light meter LM the door 49 first released by moving to one side the adjacent portion of the neck strap and then it is swung outwardly and upwardly. After such swinging the light meter is free to be slid longitudinally from the compartment 44 through the doorway 43.

The herein described case occupies but a comparatively small amount of space and therefore may be readily transported from place to place. It may be opened and closed with facility and characterized by the fact that it affords complete protection for the camera and permits the camera to be stored with its lens extended and its attachments applied thereto for immediate use in connection with photographic work upon opening of the cover of the case. By reason of the fact that the case includes the hinged section 13 which embodies the compartment 44 for the light meter the light-meter is always available and in proper position for inspection during photographic work with the camera C.

Whereas the case has been described as being primarily adapted for use in connection with a camera having an extensible lens it is to be understood that it may be used with other forms or types of photographic equipment. It is also to be understood that the invention is not to be restricted to the details set forth, since these may be modified within the scope of the appended claims, without departing from the spirit and scope of the invention.

Having thus described the invention, what claim as new and desire to secure by Letters Patent is:

1. A case for a camera, comprising in combination a box-like body having an open top, a cover for closing the open top of the body, a movable section having a camera compartment defined by walls for enclosing the bottom and side parts of the camera, and also having releasable means for securing the camera in the compartment and suitable openings for exposing the camera operating parts, said section being proportioned to fit in the body beneath the cover when the latter is in its closed position, and a detachable hinge connecting means between the section and the body comprising a member secured to said section and a member secured to said body, said first mentioned member being movable with said section whereby the section may be rotated outside of the body upon opening of the cover in a position wherein the camera is usable for ph tographic work while in said compartment and means cooperating with said members to free the section from the body and permit said section and the camera to be used independently of said body.

2. A case for a camera with an extended lens, comprising in combination a box-like body having an open top and embodying a lens receiving space in the bottom thereof and storage compartments around said space, a movable section having a camera compartment formed of walls for enclosing the bottom and side walls of the camera, and also having suitable openings in said compartment walls for exposing the lens and other operating parts of the camera, hinge connecting means between the section and the body comprising a member secured to said section and a member secured to said body, said first mentioned member being movable with said section whereby said section may be rotated from a closed position wherein it is disposed over the storage compartments and the lens of the camera projects into said space into an operating position outside of the body wherein the camera is usable for photographic work while in its compartment.

3. A case for a camera with an extended lens, comprising in combination a box-like body having an open top and embodying in the bottom portion thereof a lens receiving space and door closed storage compartments around the space, a movable section having a camera compartment formed of walls for enclosing the bottom and side walls of the camera, and also having suitable openings in said compartment walls for exposing the lens and other camera operating parts, and hinge type connecting means between said section and one of the end walls of the body so that the said section may be rotated from a closed position wherein it overlies and serves to close the doors of the storage compartments and the lens of the camera is disposed in the space into an operating position wherein it is disposed exteriorly of the body and the camera is usable for photographic work while in its compartment.

4. A case for a camera with an extended lens, comprising in combination an elongated box-like body having an open top and embodying in the bottom portion thereof a lens-receiving space and door closed storage compartments around said space, a cover for closing the open top of the bottom hinged to the upper portion of one of the side walls of the body, a movable section having a camera compartment formed of walls for enclosing the bottom and side walls of the camera, and also having suitable openings in said compartment walls for the lens and other operating parts of the camera, said section being adapted to be positioned within the upper portion of the body in overlying relation with the doors of the compartment and so that the lens of the camera is disposed in said space, and a pivotal connection between the section and one of the end walls of the body whereby the section upon swinging of the cover into its open position may be rotated outside of the body into an operating position wherein the camera is usable for photographic work while in said compartment.

5. A case for a camera with an extended lens, comprising in combination an elongated box-like body having an open top and embodying in the bottom portion thereof a lens receiving space and storage compartments around said space, a cover for closing the open top of the body hinged to the upper portion of one of the side walls of said body, a movable section having a camera compartment formed of walls for enclosing the bottom and side walls of the camera, and also having releasable means for securing the camera in the compartment and suitable openings in said compartment walls for exposing the lens and other camera operating parts, said section being adapted to be positioned within the upper portion of the body beneath the cover and in such position that it overlies and covers the storage compartments and the lens of the camera is disposed in the space, and a detachable hinge connecting means between the section and one of the end walls of the body comprising a member secured to said section, a member secured to said one end wall of the body, and a removable element between and serving pivotally to connect the two members, said hinge being adapted to permit the section to be rotated outside of the body upon opening of the cover into a position wherein the camera is usable for photographic work while in said compartment and being further adapted upon detachment or removal of the element to free the section from the body and permit said section and the camera to be used independently of the body and said cover.

6. A case for a camera, comprising in combination a box-like body having an open top, a cover for closing the open top of the body, a movable section having a camera compartment formed of walls for enclosing the bottom and side walls of the camera and also having suitable openings in said compartment walls for exposing the camera operating parts, said section being adapted to be positioned within the upper portion of the body beneath the cover when the latter is in its closed position, and hinge connecting means between the section and the body comprising a member secured to, and movable with, said section and a coacting member secured to one wall of said body adjacent the top opening thereof, said connecting means being arranged to permit the section to be rotated out of the body upon opening of the cover into an operating position wherein the camera is usable for photographic work while in said compartment and adapted upon closing of the cover and while the section is in its operating position to permit the section to be rotated into a position wherein it is supported on the cover and the cover and body are usable as a stand or base in connection with certain photographic uses of the camera.

7. A case for a camera, comprising in combination an elongated box-like body having an open top, a cover for closing the open top of the body hinged to one of the side walls of said body, a movable section having a camera compartment formed of walls for enclosing the bottom and side walls of the camera, and also having suitable openings in said compartment walls for the camera operating parts, said section being adapted to fit within the upper portion of the body beneath the cover when the latter is in its closed position, and hinge connecting means between the section and one of the end walls of the body comprising a member secured to, and movable with, said section and a member secured to said one end wall of the body adjacent the open top of the body, said hinge connecting means being adapted to permit the section upon opening of the cover to be rotated outside of the body into an operating position wherein the camera is usable for photographic work while in its compartment and being further adapted when the cover is closed and the section is in its operating position to permit the section to be rotated into a position wherein it is supported on the cover and the cover and body are usable as a stand or base in connection with certain photographic uses of the camera.

8. A case for a camera, comprising in combination an elongated box-like body having an open top and a strap slot adjacent said open top, a hinged cover member for closing the open top of the body, a movable section having a camera compartment formed of walls for enclosing the bottom and side walls of the camera and also having suitable openings in said compartment walls for exposing the camera operating parts, and adapted to fit in the body beneath the cover when the latter is in its closed position and upon opening of the cover to be rotated out of the body into a position wherein the camera is usable for photographic work while in its compartment, and a strap for carrying the case when the section is in the body having a part attached to said section and another part extending through said strap slot, and a third part disposed exteriorly of the body for carrying purposes.

9. A case for a camera, comprising in combination a box-like body having an open top and a pair of slots in one of its walls, a cover for closing the open top of the body hinged to another wall of the body, a movable section having a camera compartment formed of walls for enclosing the bottom and side walls of the camera and also having suitable openings in said compartment walls for exposing the camera operating parts said section being hinged to the body so that it is adapted when the camera is not in use to fit in the body beneath the cover, and when the camera is desired for use upon swinging of the cover in its open position to be rotated into an operating position wherein it is exteriorly disposed with respect to the body and the camera is usable for photographic purposes while in said compartment, and a continuous elongated carrying strap for the case having one end thereof extending around and anchored to the section and adapted when the section is in the body and the cover is closed to have its side parts extend through the slots in said one end wall of the body and its other end part disposed exteriorly of the body for carrying purposes.

10. A case for a camera, comprising in combination a box-like body member having an open top and a pair of slots positioned in one of its walls, a cover member for closing said open top of the body hinged to one of the side walls of said body, a movable section having a camera compartment formed of walls for enclosing the bottom and side walls of the camera and also having releasable means for securing a camera in the compartment and suitable openings in said compartment walls for exposing the camera operating parts, said section being adapted to fit in the body member beneath the cover member when the latter is in its closed position, a detachable hinged connection between the section and one of the end walls of the body member arranged to permit the section to be rotated outside of the body member upon opening of the cover into a position wherein the camera is usable for photographic work while in said compartment and adapted upon detachment thereof to free the section from the body member and permit the latter and the camera member to be used independently of said body and cover members, and an elongated continuous carrying strap having one end thereof extending around and anchored to the section and adapted for use in carrying the section upon detachment of the hinge connection and further adapted when the section is in the body member and the cover member is in its closed position, to have its side parts extend through said slots and its other end part disposed exteriorly of the body member for carrying purposes.

11. A case for a camera, comprising in combination a box-like body having an open top and in addition a pair of open ended slots in the upper portion of one of the end walls thereof, a cover for closing the open top of the body hinged to one of the side walls of the body, a movable section having a camera compartment formed of walls for enclosing the bottom and side walls of a camera together with releasable means for securing a camera in the compartment and suitable openings in said compartment walls for exposing the camera operating parts and adapted in connection with closing of the case to fit in the body beneath the cover, a detachable hinge connection between one edge of the section and the upper edge of the other end wall of the body arranged to permit the section to be rotated outside of the body upon opening of the cover into a position wherein the camera is usable for photographic work while in said compartment, and adapted upon detachment thereof to free the section from the body and to permit the latter and the camera to be used independently of said body and cover, and an elongated continuous carrying strap having one end thereof extending around and anchored to the section and adapted for use in carrying the section and camera upon detachment of the hinge connection and further adapted when the section is in the body and the cover is closed to have the side parts thereof extend through the slots in said one end wall of the body and its other end disposed exteriorly of the body for carrying purposes.

12. A case for a camera, comprising in combination a body having an open top, a cover for closing the open top of the body, a movable section having a camera compartment formed of walls for enclosing the bottom and side walls of the camera, and also having suitable openings in said compartment walls for exposing the camera operating parts and a second compartment therein for a light meter together with suitable openings in said compartment walls for exposing the operating parts of said meter, said section being adapted to be positioned within the upper portion of the body beneath the cover when the latter is in its closed position, and a connection between the section and the body comprising a member secured to said section and a member secured to said body, said first member being movable with said section, whereby the section upon opening of the cover is adapted to be moved outside of the body into a position wherein the camera and light meter are usable in connection with photographic work while in their respective compartments.

13. A case for a camera, comprising in combination a box-like elongated body having an open top, a cover attached to one of the side walls of the body for closing the open top of the body, a movable section comprising an upper compartment having walls for enclosing the bottom and side walls of a camera together with suitable openings in said compartment walls for exposing the camera operating parts, and a lower compartment for a light meter together with openings for exposing certain parts of the meter, said section being adapted to fit in the body beneath the cover when the latter is in its closed position, and hinged connecting means between the section and one of the end walls of the body comprising a member secured to said section and a member secured to one of the end walls of said body, said first mentioned member being movable with said section, whereby the section upon swinging of the cover into its open position is adapted to be rotated outside of the body into a position wherein the camera and light meter are usable in connection with photographic work while in their respective compartments.

14. A case for a camera, comprising in combination a box-like body having an open top, a cover for closing the open top of the body, a movable section comprising an upper camera compartment having walls for enclosing the bottom and side walls of a camera and releasable means for securing the camera in the compartment and suitable openings in said compartment walls for exposing the camera operating parts, and also a lower compartment for a light-meter together with releasable means for securing the meter in place and suitable openings for exposing the meter operating parts, said sections being adapted upon closing of the case to fit in the body beneath the cover, and a detachable hinge connection between the section and the body comprising a member secured to, and movable with, the section and a member secured to said body, said members being arranged to permit the section to be rotated outside of the body upon opening of the cover into a position wherein the camera and meter are usable for photographic work while in their respective compartments and adapted upon detachment thereof to free the section from the body and permit the latter and the camera and meter to be used independently of said body.

15. A case for a camera with an extended lends, comprising in combination an elongated box-like body having an open top and embodying in the bottom portion thereof a lens receiving space and storage compartments around such space, a cover for closing the open top of the body hinged to one of the side portions of said body, a movable section comprising an upper compartment formed of walls for enclosing the bottom and side walls of a camera and suitable wall openings for exposing the lens and other operating camera parts and a lower compartment for a light-meter together with suitable wall openings for exposing the adjoining parts of the meter, said section being adapted in connection with closing of the case to fit in the upper portion of the body in overlying relation with the storage compartments and so that the lens of the camera is positioned in the aforesaid space, and hinged connecting means between the section and one of the end walls of the body comprising a member secured to said section and a member secured to said one of the end walls of the body, said first mentioned member being movable with said section, whereby the section upon rotating the cover into its open position is adapted to be swung outside of the body into an operating position wherein the camera and meter are usable while in their respective compartments for photographic work.

WALTER C. WICKER.